United States Patent [19]

Scharfenberger

[11] E Patent Number: Re. 32,151

[45] Reissued Date of Patent: May 20, 1986

[54] VARIABLE LOW-PRESSURE FLUID COLOR CHANGE CYCLE

[75] Inventor: James A. Scharfenberger, Indianapolis, Ind.

[73] Assignee: Ransburg Corporation, Indianapolis, Ind.

[21] Appl. No.: 479,485

[22] Filed: Mar. 28, 1983

Related U.S. Patent Documents

Reissue of:

[64] Patent No.: 4,348,425
Issued: Sep. 7, 1982
Appl. No.: 275,872
Filed: Jun. 22, 1981

U.S. Applications:

[63] Continuation-in-part of Ser. No. 228,166, Jan. 26, 1981, Pat. No. 4,311,724.

[51] Int. Cl.[4] ..... B05D 7/14; B05D 1/00

[52] U.S. Cl. ..... 427/8; 427/445; 118/688; 118/692

[58] Field of Search ..... 427/8, 445

[56] References Cited

U.S. PATENT DOCUMENTS

| | | | |
|---|---|---|---|
| 3,348,774 | 10/1967 | Wiggens | 118/302 |
| 3,605,683 | 9/1971 | Wiggens | 118/324 |
| 3,674,205 | 7/1972 | Kock | 239/1 |
| 4,362,124 | 12/1982 | Fleig | 118/698 |

*Primary Examiner*—Sam Silverberg
*Attorney, Agent, or Firm*—Barnes & Thornburg

[57] ABSTRACT

Automatic finish coating equipment employs a selectively variable low-pressure or "soft" air or solvent signal to control pushing of coating material through a feed tube from a coating material source to a coating material atomizing and dispensing device. This "soft fluid push" method maximizes the finish quality which can be achieved with coating materials having different characteristics, such as viscosities, in any operation in which frequent changes in coating material characteristics are experienced, such as, when frequent changes of coating material color are employed.

15 Claims, 6 Drawing Figures

VARIABLE LOW-PRESSURE FLUID COLOR CHANGE CYCLE

Matter enclosed in heavy brackets [ ] appears in the original patent but forms no part of this reissue specification; matter printed in italics indicates the additions made by reissue.

This is a continuation-in-part of previously filed, copending U.S. Patent Application Ser. No. 228,166, filed Jan. 26, 1981, assigned to the same assignee as the present invention, and now U.S. Pat. No. 4,311,724.

This invention relates to coating and finishing equipment, and particularly to automatic coating equipment which experiences frequent changes in the characteristics of the coating materials being dispensed, such as, automatic coating equipment on an automatic paint line where coating material colors are changed ordinarily from one automobile to the next.

A standard technique used in the automotive finishing industry, where automatic coating equipment dispenses finish onto automobiles in an essentially assembly line fashion, and where color changes are frequent, occurring ordinarily from one automobile to the next, is to use air at a relatively low superatmospheric pressure, frequently called "soft" air, to push the last of a quantity of finish of a given color from the automatic coating equipment coating material delivery tube to the coating material atomizing and dispensing device. This technique is used to minimize the amount of coating material which remains in the feed tube at the end of the dispensing cycle for a given color (i.e., at the end of an automobile) to minimize the amount of coating material wasted at the end of a dispensing interval for a given color, to minimize the amount of solvents, etc., emitted from the painting operation during a color change cycle, and to minimize the amount of time required to conduct a color change.

A problem which has always attended to use of this so-called "soft air push" is that different colors of coating material have different characteristics, such as viscosity, and therefore, behave differently under the same low pressure signal, such as is used to conduct a soft air push. These pressures are typically in the neighborhood of, for example, 40 pounds per square inch ($2.75\times10^6$ dynes/cm$^2$). Thus, the use of constant soft air pressure to conduct the push results in different delivery rates of coating materials through the coating material feed tube to the atomizing and dispensing device. This, of course, results in variations in the delivery rate of coating material to the article being coated, illustratively, an automobile body, and a consequent variation in the amount of coating material dispensed on the body, the thickness of this finish coating, and a compromise in the quality of the finish.

The present invention relates to methods and apparatus by which this problem can be overcome. The thrust of the present invention is to provide a selectively variable soft air or solvent source which can be varied according to the characteristics of the color being dispensed, so that when the soft air or solvent push is conducted, it is conducted at a sufficient pressure to maintain an essentially constant delivery rate of coating material to the atomizing and dispensing device, without being conducted at such a high pressure that the delivery rate is excessive, causing the coating material "slug" in the feed tub to "run out" before the end of the article being coated is reached. This result is achieved by varying the pressure of the soft air or solvent in accordance with the characteristics of the coating material being dispensed, with the soft air or solvent pressure changing in a preselected manner from one set of coating material characteristics to the next set of coating material characteristics, illustratively, by the same program which determines what color is dispensed onto a particular target.

According to the invention, in a process and apparatus for terminating the flow of coating material to a coating material delivery tube which delivers the coating material to a dispensing device from which the material is dispensed during a coating operation, and from which flow of the material ceases at the end of the coating operation, the flow of coating material to the delivery tube is first terminated before the end of the coating operation, and the flow of a fluid (gas or liquid) at low superatmospheric pressure is initiated to the delivery tube to ensure continued delivery of coating material from the delivery tube to the dispensing device during the interval between shut-off of coating material flow to the delivery tube and the end of the coating operation, and the low superatmospheric pressure is adjusted to account for variations in coating material characteristics to promote relatively constant delivery of coating materials having different characteristics.

According to another aspect of the invention, in a multiple-coating dispensing device system for coating articles, process and apparatus for terminating the flows of coating material in respective coating material delivery tubes which deliver the coating material to respective dispensing devices from which the material is dispensed during a coating operation onto respective zones of the article to be coated thereby, and from which devices flows of the material cease at the end of the coating operation, the flows of coating material to the delivery tubes are terminated before the end of the coating operation selectively at times determined by the characteristics of the respective zones to be coated, and the flow of a fluid (gas or liquid) is initiated at low superatmospheric pressure to the delivery tubes after the respective terminations of the flows of coating material to the delivery tubes to ensure continued delivery of coating material from the respective delivery tubes to the respective dispensing devices during the intervals between shut-offs of coating material flows to the respective delivery tubes and the end of the coating operation.

The invention may best be understood by referring to the following description and accompanying drawings which illustrate the invention. In the drawings.

Figure 1:
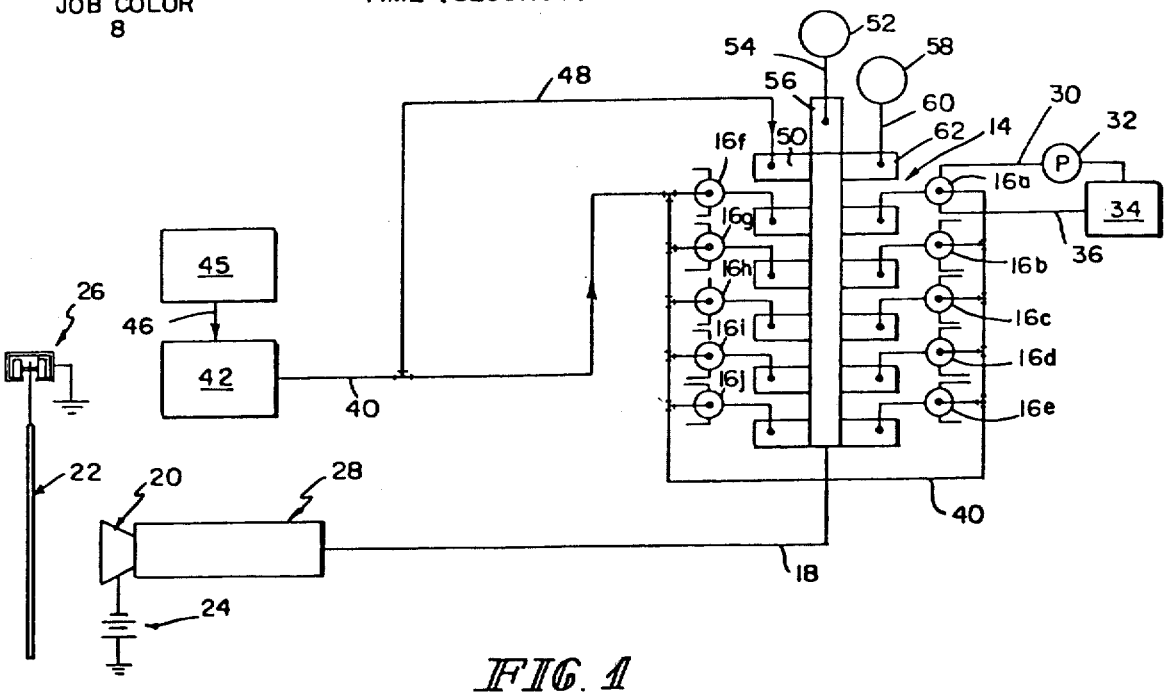
FIG. 1 is a partly block and partly schematic diagram of a single atomizing device and associated coating material color control system for dispensing any one of ten different coating materials having different characteristics.

Turning now to FIG. 1, a ten-color manifold 14 controls the flow of coating materials from each of ten different sources (only one of which is shown) through ten independently operated pressure control valves 16a–j to a single feed tube 18. Feed tube 18 is coupled to an atomizing and dispensing device 20 of known construction (see, for example, U.S. Pat. No. 4,148,932). From device 20, a selected one of the ten colors is dispensed in atomized fashion and deposited upon a target 22 to coat it.

As illustrated diagrammatically, the atomizing and dispensing device 20 is typically held at a high-magnitude potential by an electrostatic potential supply 24. Target 22 is typically one of a number of targets which are conveyed serially past the stationary, or relatively stationary, atomizing and dispensing device 20 on a conveyor 26. Feed tube 18 typically is electrically nonconductive, and the device 20 is typically supported from an insulating column 28 to minimize leakage of electrostatic potential from device 20 to ground. This ensures that a maximum amount of electrostatic charge is available to charge atomized and dispensed particles of coating material, which then migrate under the influence of the electric field established between device 20 and the grounded target 22.

Turning now more specifically to the construction of the manifold 14 and its associated components, and with reference to valve 16a, each of valves 16a–16j includes a coating material delivery line 30 which is coupled through a pump 32 to a coating material source 34. Each valve 16a–j also includes a recirculating line 36 through which coating material delivered through line 30 by pump 32 from source 34 is recirculated to source 34 when the valve 16a–j is in the recirculate position. Although only one delivery system 30, 32, 34, 36 for coating material to a valve (16a) is shown, it is understood that each of valves 16a-j has such a system for a different coating material associated with it. Valves 16a–j can be of the types illustrated in, for example, U.S. Pat. No. 3,334,648.

The pressures of the various coating materials delivered from the various sources 34 to the various valves 16a–j are regulated through a common low-pressure air line 40 from an electrical signal-to-air pressure transducer and volume booster 42.

The input signal to electrical signal-to-air pressure transducer and volume booster 42 is provided by an electrical signal output of a program control device 45 of the type described in U.S. Pat. Application Ser. No. 35,105, titled ANALOG PAINT OUTPUT CONTROL, and assigned to a subsidiary of the assignee of the present invention, now abandoned. A brief description of the program control device 45 will suffice for purposes of explanation. The program control device is programmable to provide electrical output signals which actuate respective valves 16a–j in accordance with the desired coating materials to be dispensed upon respective targets 22 as the targets are conveyed along the conveyor 26 past device 20. That is, the program which is stored in the program control device 45 and which controls the operation of the system illustrated in FIG. 1 actuates individual valves 16a–j to open and close as targets 22 to be painted by the various colors dispensed through valves 16a–j appear before device 20.

In addition to providing this electrical control of valves 16a–j, the program control device includes stored information relative to the characteristics of each of such coating materials, and calls up the stored information relative to the characteristics of a particular coating material dispensed by a particular valve 16a–j, as that particular valve 16a–16j is actuated to dispense its respective coating material. This information relative to characteristics appears as a direct-current electrical signal on line 46. Typically, each of the coating materials to be dispensed by a respective valve 16a–j has associated with it a different DC voltage level on line 46. Typically, these DC voltage levels on line 46 are generated by closing of respective switches within the program control device, in accordance with the program stored therein, to couple different DC voltage supplies, or a single voltage supply through the various steps of a resistive voltage divider within the program control device, to line 46. In any event, the different DC voltage levels appearing on line 46 correspond to respective different pressures in low-pressure air line 40 and different pressures in the coating materials dispensed from respective valves 16a–j into the ten-color manifold 14.

As an example, let it be assumed that valve 16b is coupled to a source of a green-colored coating material. Let it further be assumed that pressure-control valve 16c controls the supply of a blue-colored coating material to manifold 14. Let it be assumed that the green-colored material has a higher viscosity. It is apparent that, if a soft air push is used to move these coating materials through the manifold 14 and feed tube 18 near the end of a coating cycle of a green-coated target 22 and a blue-coated target 22, respectively, a slightly higher soft air pressure will be required to deliver the green material to device 20, and a slightly lower soft air pressure will be required to deliver the blue material to device 20 at the same rate. These necessary adjustments are made in the air pressure delivered to air line 48 to a soft air supply control valve 50 mounted on manifold 14.

After the target 22 to be coated has passed device 20, and a color change is to be made, solvent from a solvent supply 52 is provided through a solvent supply line 54 and a solvent supply valve 56 to manifold 14 to flush any coating material remaining in manifold 14, feed tube 18, and device 20 from these components so that this color will not contaminate the next color to be dispensed through manifold 14. So that the solvent does not affect the viscosity of the next coating material, particularly during the early stages of the dispensing process for the next coating material, the solvent is dried using high-pressure air provided by a supply 58 through a high-pressure air supply line 60 and a high-pressure air supply valve 62 on manifold 14.

Figure 2:
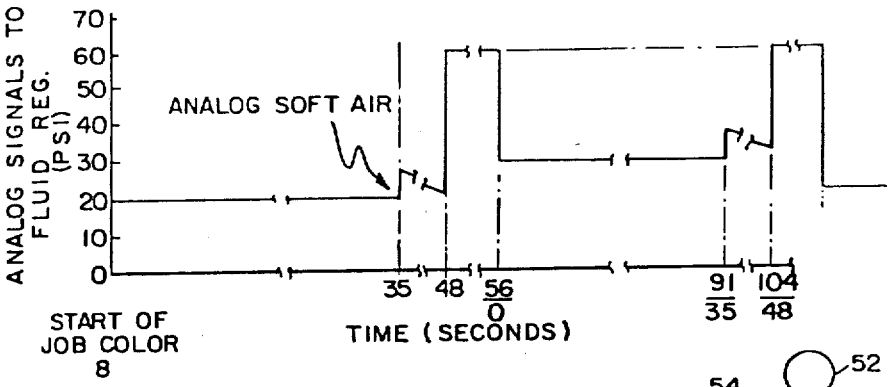
FIG. 2 is a time chart which illustrates portions of typical color-change cycles.

An example of a color change cycle with the system illustrated in FIG. 1 is illustrated in FIG. 2. During the time interval from 0 to 35 seconds, a first color is being dispensed at a line 40 pressure of about 20 p.s.i.a. ($1.38 \times 10^6$ dynes/cm$^2$). Toward the end of the interval during which the first color is to be dispensed, valve 50 is actuated and air at a slightly higher pressure (e.g., 25 p.s.i.a.-$1.72 \times 10^6$ dynes/cm$^2$) is supplied through line 48 and valve 50 to push the end of the first color from manifold 14 through feed tube 18 to device 20. The rate of flow of the first coating material is maintained substantially constant througout this interval, even though no more coating material is being supplied through a respective valve 16a–j to manifold 14. Since the remaining "slug" of coating material in the feed tube 18 is becoming continuously smaller, reducing its resistance to flow, this substantially constant flow is achieved by employing a "ramp" air signal which starts at 25 p.s.i.a. and reduces to a somewhat lower pressure, e.g., 21 p.s.i.a. toward the end of the soft air push interval. Some other declining value signal, such as a "staircase" signal, can also be used. These signals are capable of being generated. Electronic ramp and staircase generators of known types can be incorporated into program control device 45 to drive electrical signal-to-air pressure transducer 42. The soft air push interval lasts, illustratively, from time equals 35 seconds to time equals 48 seconds. At the end of this time interval (at time equals 48 seconds), the target 22 has completely passed device 20, and relatively little of the first coating material remains in feed tube 18. Valves 56, 62 open and provide a combined solvent and high-pressure air flush at about 60 p.s.i.a. ($4.13\times10^6$ dynes/cm$^2$). Then, at time equals 56 seconds (time equals 0 seconds of the next cycle), valves 56, 62 close, terminating the flows of solvent and high-pressure air. Low-pressure air is again supplied to low-pressure line 40 at the pressure required for the dispensing of a second color at the same rate as the first color was dispensed.

In the cycles illustrated in FIG. 2, the second color is slightly more viscous and requires a slightly higher pressure in line 40 of approximately 30 p.s.i.a. ($2.07\times10^6$ dynes/cm$^2$) to maintain this constant delivery rate through manifold 14 and feed tube 18 to device 20. At time equals 91 seconds (time equals 35 seconds of the second color dispensing cycle), the pressure control valve 16a–j for the second color is closed, and valve 50 is opened, supplying soft air at a slightly higher pressure to push the remainder of the second color from manifold 14 through feed tube 18 toward device 20. A slightly higher pressure declining value "ramp" signal maintains the flow rate of the second coating material substantially constant to device 20 and assures that the quality of the finish dispensed on the target being coated is maintained uniform during the time period from the beginning of the soft air push to the beginning of the next color change purge cycle beginning at time equals 104 seconds (time equals 48 seconds of the second color change cycle).

Figure 3:
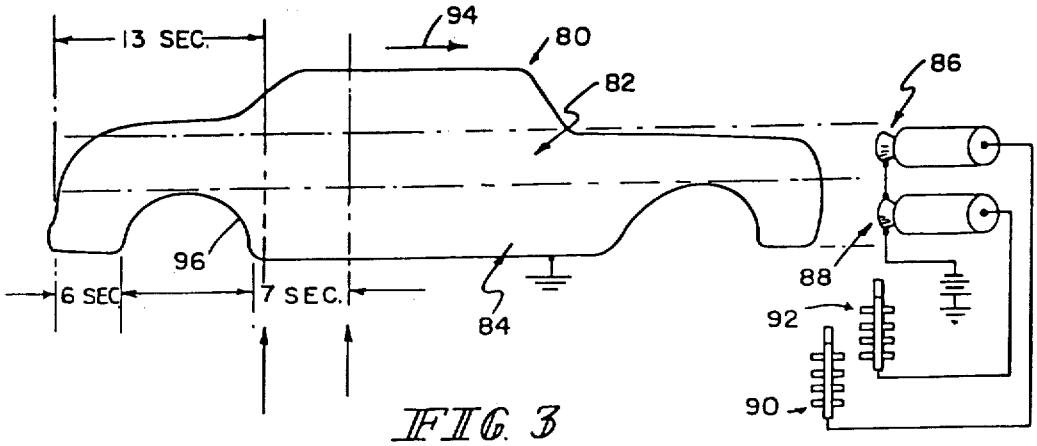
FIG. 3 is a highly diagrammatic illustration of a typical two-atomizer installation illustrating aspects of a color-change cycle.

Another aspect of the invention is best illustrated in FIG. 3. In FIG. 3, a typical target to be coated, a vehicle body 80, is divided into an upper zone 82 and a lower zone 84. The coating of the upper zone 82 is predominantly controlled by an upper atomizing and dispensing device 86. The coating of the lower zone 84 is predominantly controlled by a lower atomizing and dispensing device 88. Each device is fed from coating material sources (not shown) through a respective color change manifold 90, 92. The vehicle body 80 is moving in the direction of arrow 94 past the relatively stationary devices 86, 88 on a conveyor (not shown). Because of the existence of the rear wheel well 96, the soft air pushes of coating material to devices 86, 88 must be initiated at different times. Specifically, the soft air push for device 88 must begin about 7 seconds (in a typical case) before the rear wheel well 96 will appear before device 88, since the supply of coating material to device 88 will be substantially completely cut off by turning off soft air to manifold 92 during the approximately 7 second time interval that the wheel well 96 itself is before device 88. During the 7 second time interval that device 88 is not dispensing coating material because of the presence of the wheel well, device 88 will continue to dispense coating material, for example in accordance with the signal illustrated in FIG. 2, so that zone 82 above wheel well 96 will be satisfactorily coated. Then, beginning at the rear edge of wheel well 96, device 88 will again be supplied with coating material by triggering on the soft air push for an additional 6 seconds so that the back of the vehicle body 80 rear quarter panel in lower zone 84 will be satisfactorily coated. The soft air push for the device 86, on the othe hand, begins 13 seconds before the rear end of the vehicle body 80 passes devices 86, 88 (substantially at the leading edge of the rear wheel well 96), and continues until the rear end of the vehicle body 80 passes devices 86, 88.

Under certain circumstances, problems can attend the use of variable soft air to conduct the push as just described. One such problem associated particularly with the variable low pressure air pushing of more highly conductive coating materials can best be appreciated by referring to FIG. 4.

Figure 4:
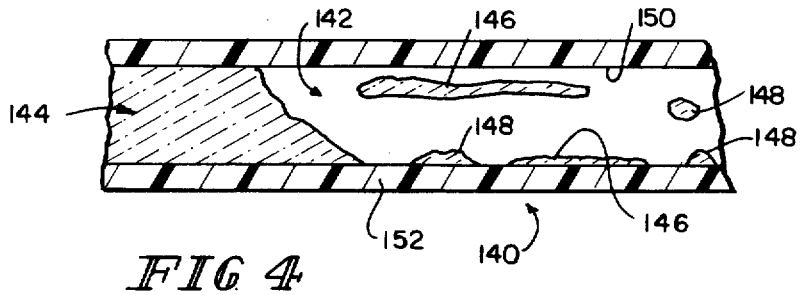
FIG. 4 is a fragmentary longitudinal sectional view of a coating material delivery tube.

In FIG. 4, a variable low pressure soft air push is being conducted through a delivery tube 140 illustrated in cross section. As the region 142 on the right of FIG. 4 empties of coating material 144 under the influence of soft air in region 142, small tracks 146 and pools 148 of coating material remain on the delivery tube 140 inner wall surface 150. It must be remembered that in a coating material atomizing operation which is electrostatically aided, the column of coating material 144 will be at some potential between the typically high magnitude (e.g., −100 KVDC) potential of the atomizing device (see FIG. 1, device 20 and FIG. 3, devices 86, 88) and ground, owing to the direct coupling of the column of coating material 144 inside delivery tube 140 to the atomizing device. Thus, as the column breaks up forming the tracks 146 and pools 148, arcing typically can occur between and among the various tracks 146 and pools 148 which are at different electrical potentials.

A number of hazards are immediately apparent. Typically, the coating material vapors, solvent vapors, and the like in region 142, mixed with the soft air, are combustible. Additionally, the presence of electrical discharges within the tube 140 and adjacent wall surface 150 promotes or aggravates harmful chemical activity in the otherwise relatively chemically inert material from which delivery tube 140 is ordinarily constructed. This can result in minute "pinholes" forming in the wall 152 material. This, of course, raises the possibility of leakage of coating materials and solvents through the pinholes. Since the coating materials are frequently at potentials other than ground, the possibility of grounding the column of coating material 144 to articles on the outside of tube 140 adjacent such pinholes arises.

As described above, a typical color-change cycle involves flushing of the delivery tube 140 with solvent. Thus, in this second embodiment of the invention, the variable low pressure push of the tail or slug of coating material prior to the initiation of a color-change cycle is conducted using the solvent which will be used during the flushing portion of the cycle, rather than the low pressure air. This has several advantages. First, since the column of coating material is followed by a column of solvent, there is no danger of arcing among the various tracks 146 and pools 148, the presence of which was attributable to the soft air pushing the tail of coating material. Thus, the use of a soft solvent push as taught by this embodiment enhances the safety of the system in this regard. An attendant benefit is that, since there are no open arcs adjacent wall surface 150, the likelihood of pinholing of the delivery tube wall 152 is significantly reduced. Therefore, so is the risk of leakage of coating materials and solvents through such pinholes. Safety of the system is enhanced from this standpoint also.

An added significant benefit can be understood by recognizing that the delivery tube 140 must be flushed with the solvent during the color-change cycle anyway. Use of the same solvent material for the soft solvent push and for flushing permits a much faster color-change cycle to be used.

With reference to FIG. 2, it will be recalled that in certain situations, it is necessary to reduce the soft air pressure fairly steadily from the beginning to the end of the soft air push to account for the decreasing drag of the steadily decreasing tail or slug of coating material being pushed from the delivery tube to the atomizing device. This is necessary to ensure a relatively steady delivery rate of coating material from the slug to the atomizing device during the push. With the soft solvent push of the second embodiment, this steadily decreasing "ramp" of soft solvent pressure adjustment will be necessary in far fewer cases tha it is when air is used for the soft push. This is so because the drag of the solvent used to perform the soft solvent push typically much more closely aapproximates the drag of the coating material against the delivery tube walls than does the drag of air when air is used for the soft push.

Figure 5:
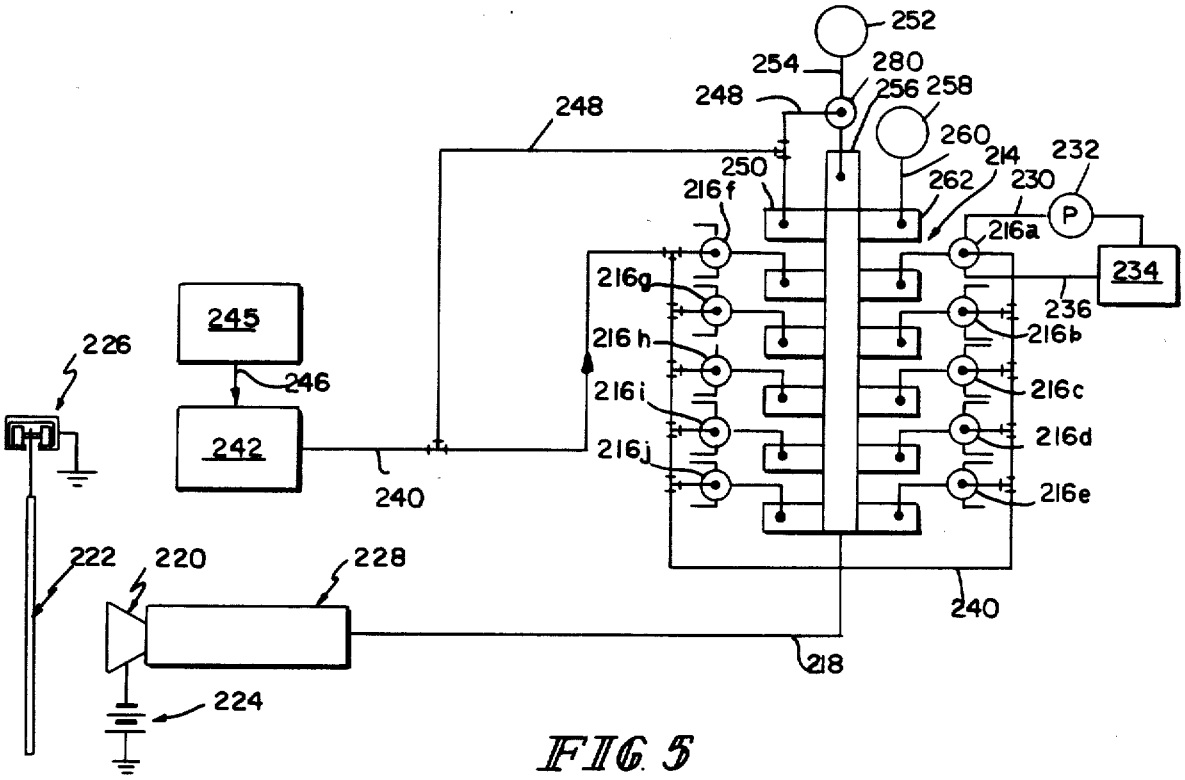
FIG. 5 is a partly block and partly schematic diagram of a single atomizing device and associated coating material color control system for dispensing any one of ten different coating materials having different characteristics.

Turning now to FIG. 5, a delivery system employing a soft solvent push will be explained in somewhat greater detail. A ten-color manifold 214 controls the flow of coating materials from each of ten different sources (only one of which is shown) through ten independently operated pressure control valves 216a–j to a single feed tube 218. Feed tube 218 is coupled to the atomizing and dispensing device 220. From device 220, a selected one of the ten colors is dispensed and deposited upon a target 222 to coat it.

Again, the atomizing and dispensing device 220 is typically held at a high-magnitude potential by an electrostatic potential supply 224. Targets 222 are conveyed serially past the stationary, or relatively stationary, atomizing and dispensing device 220 on conveyors 226.

Each of valves 216a–216j includes a coating material delivery line 230 which is coupled through a pump 232 to a coating material source 234. Each valve 216a–j also includes a recirculating line 236 through which coating material delivered through line 230 by pump 232 from source 234 is recirculated to source 234 when the valve 216a–j is in the recirculate position. Although only one delivery system 230, 232, 234, 236 for coating material to a valve (216a) is shown, it is understood that each of valves 216a–j has such a system for a different coating material associated with it.

The pressure of the various coating materials delivered from the various sources 234 to the various valves 216a–j are regulated through a common low-pressure air line 240 from an electrical signal-to-air pressure transducer and volume booster 242.

The input signal to electrical signal-to-air pressure transducer and volume booster 242 is provided by an electrical signal output of a program control device 245. Device 245 is programmed to provide electrical output signals which actuate respective valves 216a–j in accordance with the desired coating materials to be dispensed upon respective targets 222 as the targets are conveyed along the conveyor 226 past device 220. In addition to providing this electrical control of valves 216a–j, the program control device includes stored information relative to the characteristics of each of such coating materials, and calls up the stored information relative to the characteristics of a particular coating material dispensed by a particular valve 216a–j, as that particular valve 216a–216j is actuated to dispense its respective coating material. This information relative to characteristics appears as a direct-current electrical signal on line 246. The different DC voltage levels appearing on line 246 correspond to respective different pressures in low-pressure air line 240 and different pressures in the coating materials dispensed from respective valves 216a–j into the ten-color manifold 214.

Slightly before the target 222 to be coated has passed device 220, and a color change is to be made, solvent from a solvent supply 252 is provided through a solvent supply line 254 and a solvent supply valve 256 to manifold 214 to flush any coating material remaining in manifold 214, feed tube 218, and device 220 from these components so that this color will not contaminate the next color to be dispensed through manifold 214. So that the solvent does not affect the viscosity of the next coating material, particularly during the early stages of the dispensing process for the next coating material, the solvent is dried using high-pressure air provided by a supply 258 through a high-pressure air supply line 260 and a high-pressure air supply valve 262 on manifold 214.

Figure 6:
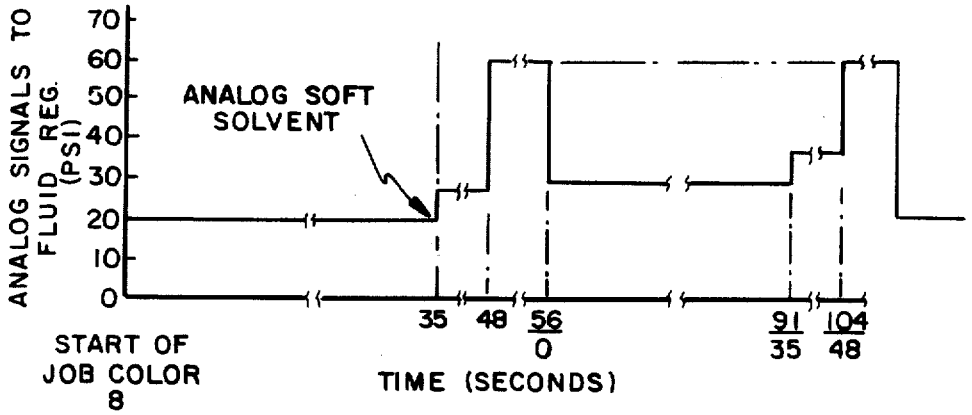
FIG. 6 is a time chart which illustrates portions of typical color-change cycles.

An example of a color-change cycle with the system illustrated in FIG. 5 is illustrated in FIG. 6, During the time interval from 0 to 35 seconds, a first color is being dispensed at a line 240 pressure of about 20 p.s.i.a. ($1.38 \times 10^6$ dynes/cm$^2$). Toward the end of the interval during which the first color is to be dispensed, valve 256 is actuated and solvent at about the same pressure is supplied through line 254 to push the end of the first color from manifold 214 through feed tube 218 to device 220. The rate of flow of the first coating material is maintained substantially constant throughout this interval, even though no more coating material is being supplied through a respective valve 216a–j to manifold 214. As previously outlined, although the remaining "slug" of coating material in the feed tube 18 is becoming continuously smaller, reducing its resistance to flow, this substantially constant flow can be achieved in many cases without employing a "ramp" solvent pressure. Occasionally, however, it may be necessary to employ a ramp solvent signal not unlike the ramp air signal illustrated in FIG. 2. Whether or not such a ramp or "staircase" or other declining value solvent pressure must be used depends upon factors such as how closely the solvent flow characteristics match those of the various coating materials being dispensed. The solvent pressure is controlled through a pressure control valve 280 which is similar in construction and operation to valves 216a–j. The soft solvent push interval lasts, illustratively, from time equals 35 seconds to time equals 48 seconds. At the end of this time interval (at time equals 48 seconds), the target 222 has completely passed device 220, and relatively little of the first coating material remains in feed tube 218. Valves 256, 262 open and provide a combined solvent and high-pressure air flush at about 60 p.s.i.a. ($4.13 \times 10^6$ dynes/cm$^2$). Then, at time equals 56 seconds (time equals 0 seconds of the next cycle), valves 256, 262 close, terminating the flows of solvent and high-pressure air. Low-pressure air is again supplied through low-pressure line 240 at the pressure required for the dispensing of a second color at the same rate as the first color was dispensed.

In the cycles illustrated in FIG. 6, the second color is slightly more viscous and requires a slightly higher pressure in line 240 of approximately 30 p.s.i.a. ($2.07 \times 10^6$ dynes/cm$^2$) to maintain this constant delivery rate through which manifold 214 and feed tube 218 to device 220. At time equals 91 seconds (time equals 35 seconds of the second color-dispensing cycle), the pressure control valve 216a–j for the second color is closed, and valve 256 is opened, supplying soft solvent to push the remainder of the second color from manifold 214 through feed tube 218 toward device 220. The soft solvent pressure, controlled through valve 280 which is coupled to the low-pressure air line 248, maintains the flow rate of the second coating material substantially constant to device 220 and assures that the quality of the finish dispensed on the target being coated is maintained uniform during the time period from the beginning of the soft solvent push to the beginning of the next color change cycle beginning at time equals 104 seconds (time equals 48 seconds of the second color change cycle).

It should further be understood that the soft solvent push technique can be readily adapted to the application technique discussed in connection with FIG. 3, with soft solvent replacing soft air.

What is claimed is:

1. A process for terminating the flow of a coating material in a coating material delivery tube which delivers the coating material to a dispensing device from which the material is dispensed during a coating operation and from which flow of the material ceases at the end of the coating operation including the steps of terminating the flow of coating material to the delivery tube before the end of the coating operation, [and] initiating the flow of a liquid medium at low superatmospheric pressure to the delivery tube to ensure continued delivery of coating material from the delivery tube to the dispensing device during the interval between shut-off of coating material flow to the delivery tube and the end of the coating operation *and adjusting the low superatmospheric pressure to maintain the rate of delivery of the coating material from the delivery tube to the dispensing device substantially constant as the volume of the remaining coating material in the delivery tube decreases and to account for variations in coating material characteristics and to promote relatively constant delivery of coating materials having different characteristics.*

[2. The process of claim 1 and further comprising the step of adjusting the low superatmospheric pressure to account for variations in coating material characteristics to promote relatively constant delivery of coating materials having different characteristics.]

3. A method of cleaning a coating material supply system associated with an atomizing device, the system including a delivery tube for delivering coating material to the device and a controller for controlling the supply of coating material to the delivery tube, the method including the steps of halting the flow of coating material to the delivery tube while the coating operation is in progress, [and] starting the flow of a liquid purging medium at low superatmospheric pressure to the delivery tube to push coating material remaining in the delivery tube out to ensure continued flow of the coating material near the end of the coating material operation in progress *and adjusting the low superatmospheric pressure to maintain the rate of delivery of the coating material remaining in the delivery tube substantially constant as the volume of the remaining coating material decreases and to account for variations in coating material characteristics and to promote relatively constant delivery of coating materials having different characteristics.*

[4. The method of claim 3 and further comprising the step of adjusting the low superatmospheric pressure to account for variations in coating material characteristics to promote relatively constant delivery of coating materials having different characteristics.]

5. A method of changing coating material colors being dispensed in a system including a dispensing device for dispensing the various coating material colors, means for feeding multiple colors to the dispensing device, and a color change sequence controller, the method comprising generating a first signal in the controller prior to the initiation of the sequence and while a pre-change color is still being dispensed onto an article to be coated, terminating the supply of coating material of the pre-change color to the color-feeding means in response to said first signal, initiating the flow of a low superatmospheric pressure liquid medium into the color-feeding means to continue to feed the pre-change color to the [atomizing] *dispensing* device while the pre-change color is still being dispensed onto the article to be coated by the pre-change color, *adjusting the low superatmospheric pressure to maintain the rate of delivery of the pre-change color to the atomizing device substantially constant as the volume of the remaining pre-change color decreases and to account for variations in coating material characteristics and to promote relatively constant delivery of coating materials having different characteristics,* and subsequently initiating the color-change sequence.

[6. The method of claim 5 and further comprising the step of adjusting the low superatmospheric pressure to account for variations in characteristics among the various coating materials to promote relatively constant delivery of all pre-change colors having different characteristics.]

7. In a multiple coating material dispensing device system for coating articles, a process for terminating the flows of coating material in respective coating material delivery tubes which deliver the coating material to respective dispensing devices from which the material is dispensed during a coating operation onto respective zones of the article to be coated thereby, and from which devices flows of the material cease at the end of the coating operation, the process including the steps of terminating the flows of coating material to the delivery tubes before the end of the coating operation selectively at times determined by the characteristics of the respective zones to be coated, and initiating the flow of a liquid coating material purging medium at low superatmospheric pressure to the delivery tubes after the respective terminations of the flows of coating material to the delivery tubes to ensure continued delivery of coating material from the respective delivery tubes to the respective dispensing devices during the intervals between shut-offs of coating material flows to the respective delivery tubes and the end of the coating operation.

8. In a multiple coating material dispensing device system for coating articles having multiple coating zones requiring different control of the various dispensing devices predominantly responsible for coating the respective zones, a method of cleaning the coating material supply systems associated with all of the coating material dispensing devices, each supply system including a respective delivery tube for delivering coating material to a respective device and a controller for controlling the supply of coating material to a respective delivery tube, the method including the steps of halting the flow of coating material to the respective delivery tubes associated with the various zones selectively at times determined by the configurations of the various zones while the coating operation is in progress, starting the flows of a liquid medium at low superatmospheric pressure to respective delivery tubes substantially immediately after such coating material flows are halted to push coating material remaining in such respective delivery tubes out to ensure continued flows of the coating material to the respective zones near the end of the coating material operation in progress.

9. A method of changing coating material colors being dispensed in a system including multiple dispensing devices for dispensing the various coating material colors onto respective ones of multiple zones of a plurality of articles to be coated, with each zone of each article being coated predominantly by material dispensed by a respective one of the multiple dispensing devices, means for feeding multiple colors to each dispensing device, and a color change sequence controller, the method comprising generating a first signal in the controller prior to the initiation of the sequence for a respective zone and, while a pre-change color is still being dispensed onto the respective zone, terminating the supply of coating material of the pre-change color to the color-feeding means in response to said first signal, initiating the flow of a low superatmospheric pressure liquid medium into the color-feeding means to continue to feed the pre-change color to the [atomizing] *dispensing* device associated with the respective zone while the pre-change color is still being dispensed onto the respective zone by the [atomizing] *dispensing* device, and subsequently initiating the color change sequence.

10. The method of claim 9 wherein the liquid medium is a solvent for the pre-change color.

*11. The process of claim 1 wherein the liquid medium is a solvent for the coating material.*

*12. The method of claim 3 wherein the liquid medium is a solvent for the coating material.*

*13. The method of claim 5 wherein the liquid medium is a solvent for the pre-change color.*

*14. The method of claim 7 wherein the liquid medium is a solvent for the coating material.*

*15. The method of claim 8 wherein the liquid medium is a solvent for the coating material.*

* * * * *